Aug. 22, 1944.  H. E. GOLBER  2,356,156
BED MOTION MECHANISM
Filed March 16, 1940   8 Sheets-Sheet 1
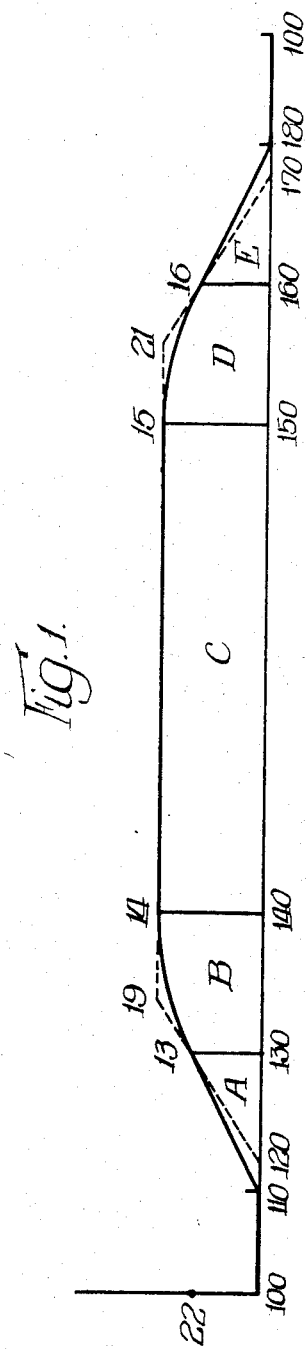
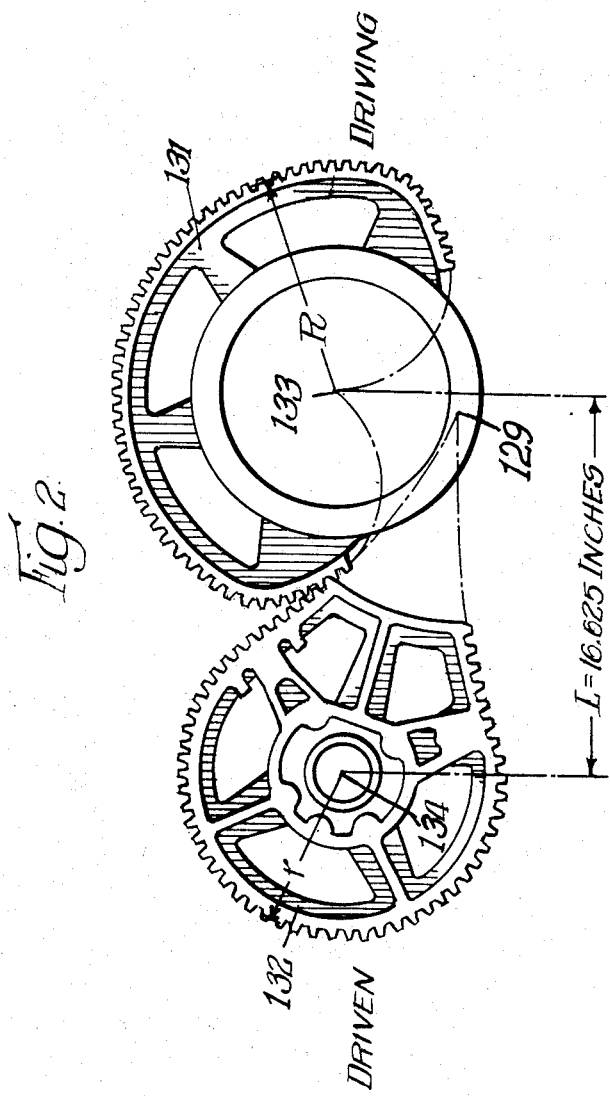
INVENTOR.
Hyman E. Golber,
BY

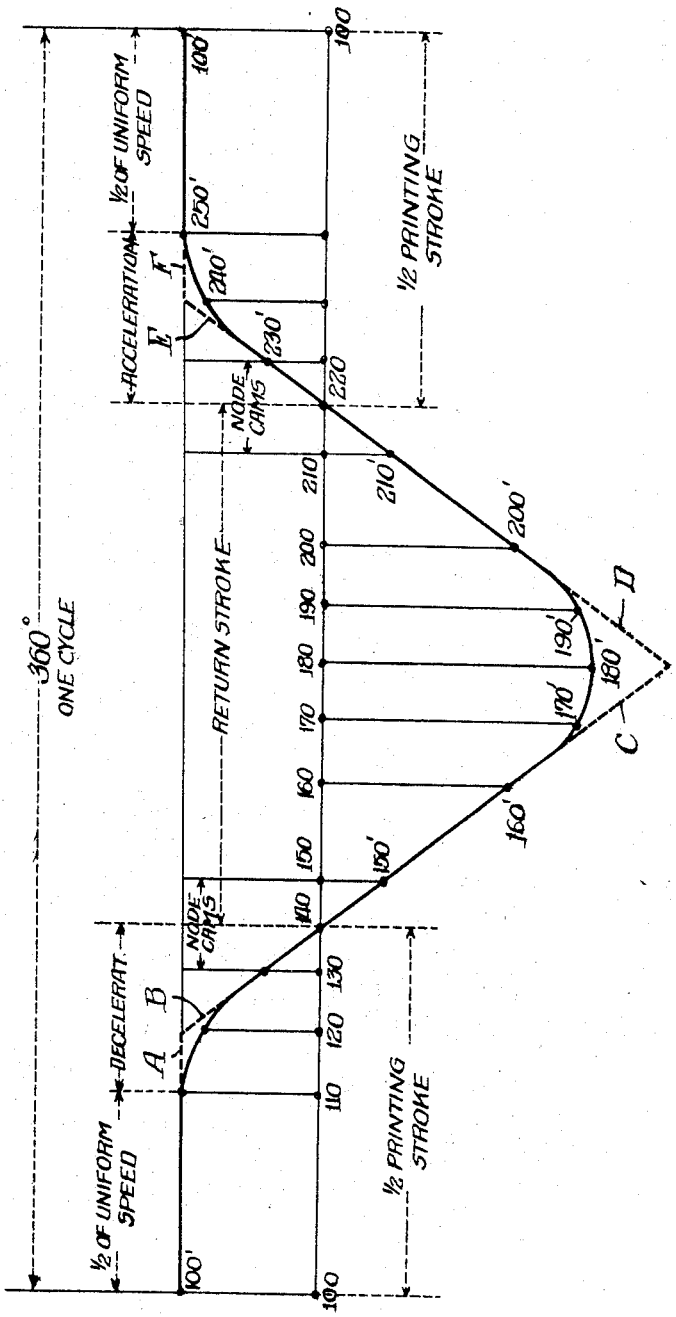

Aug. 22, 1944.  H. E. GOLBER  2,356,156
BED MOTION MECHANISM
Filed March 16, 1940  8 Sheets-Sheet 3

INVENTOR.
Hyman E. Golber;
BY
ATTORNEYS.

Aug. 22, 1944.   H. E. GOLBER   2,356,156
BED MOTION MECHANISM
Filed March 16, 1940   8 Sheets-Sheet 4
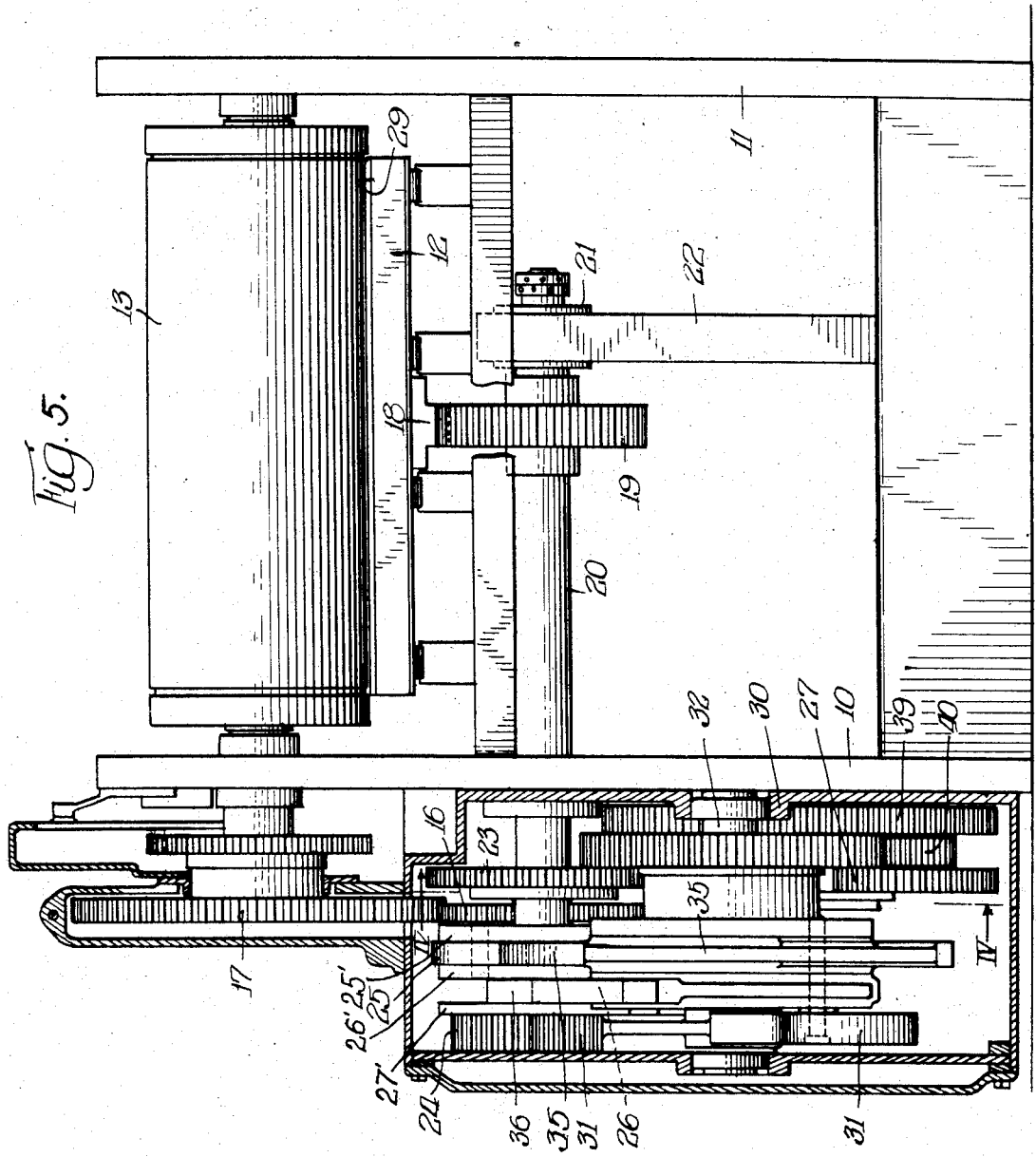
INVENTOR.
Hyman E. Golber,
BY
ATTORNEYS.

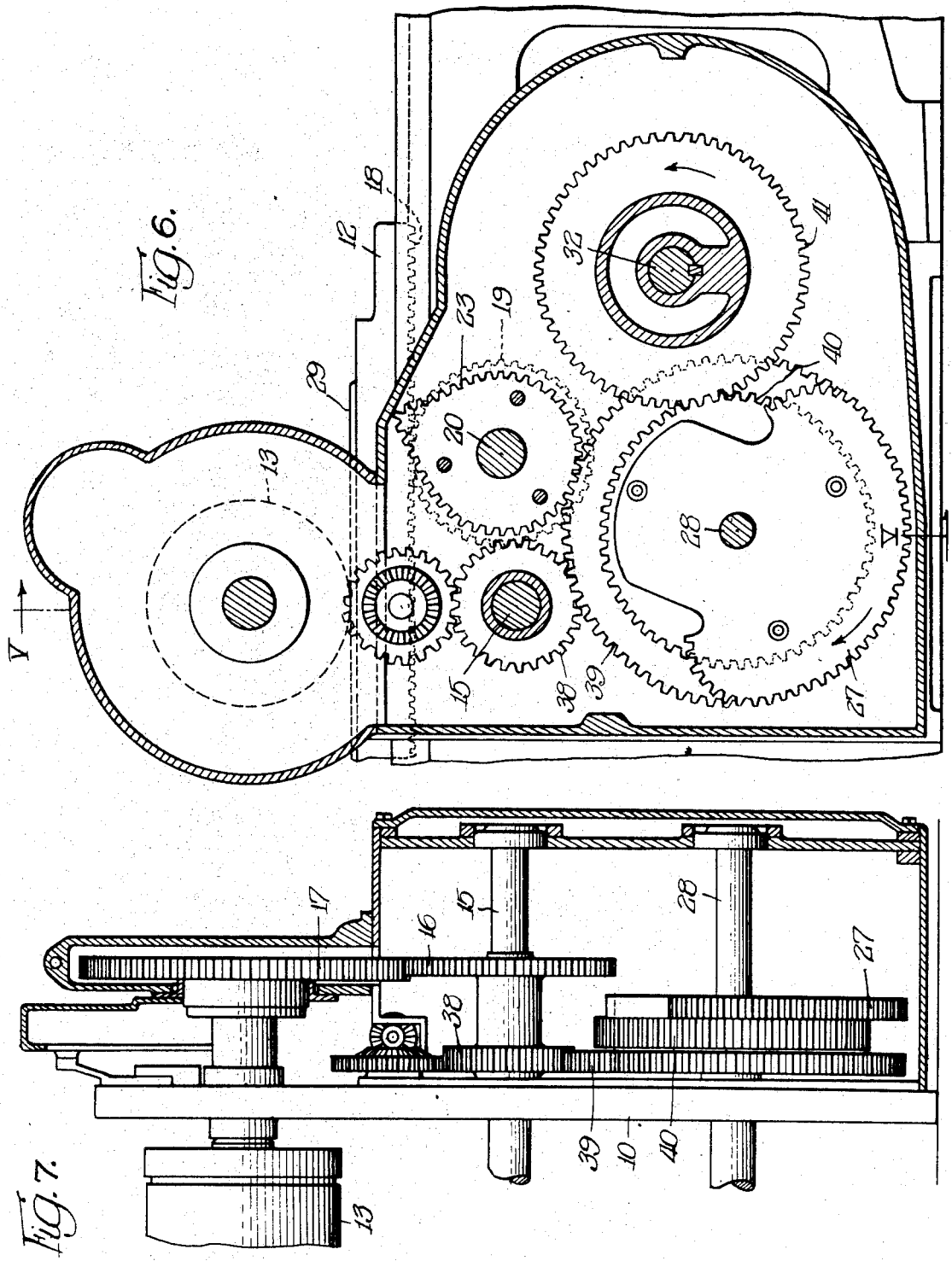

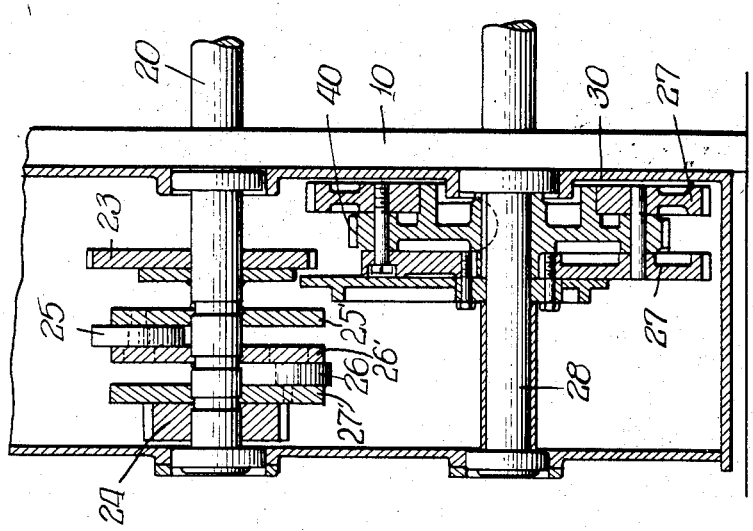
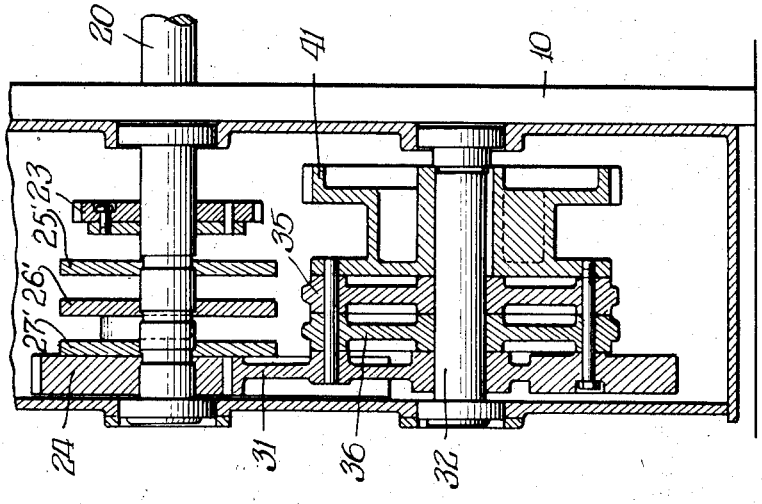

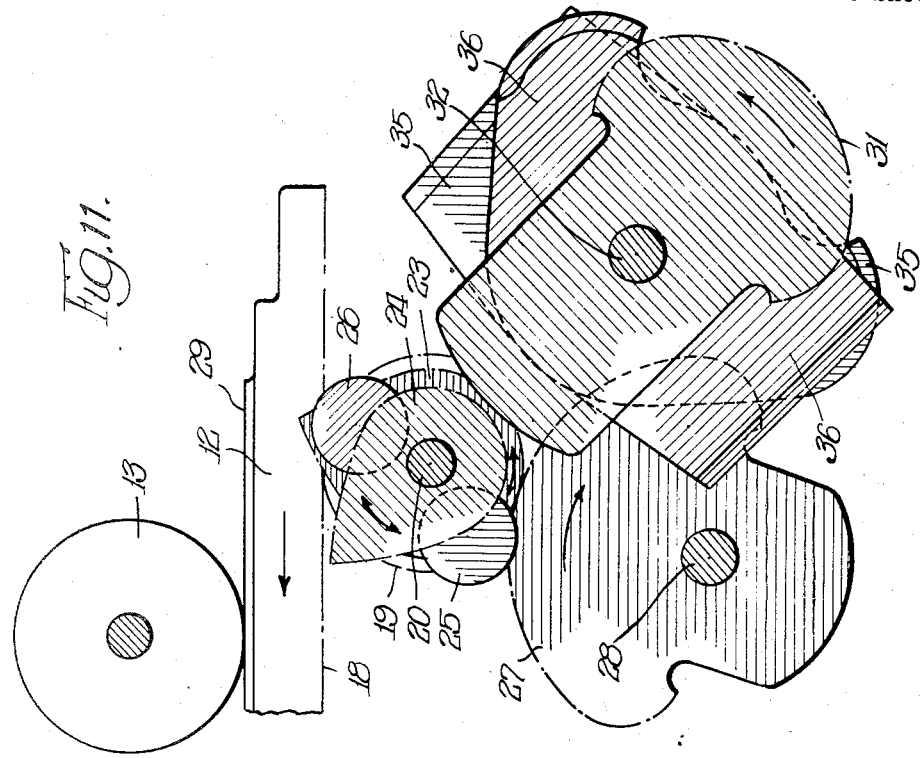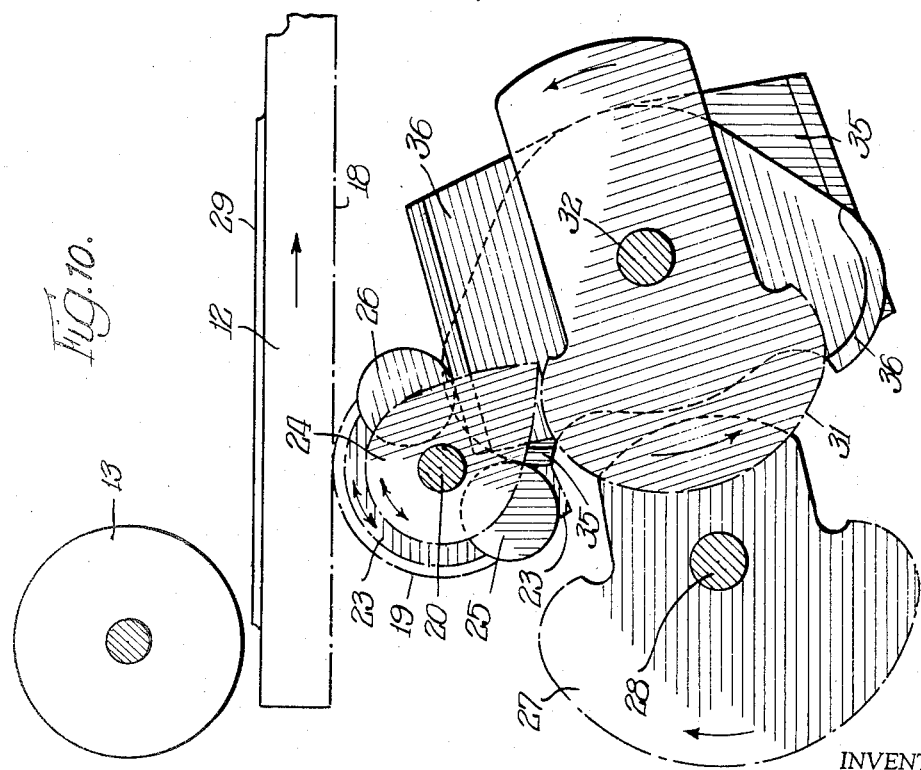

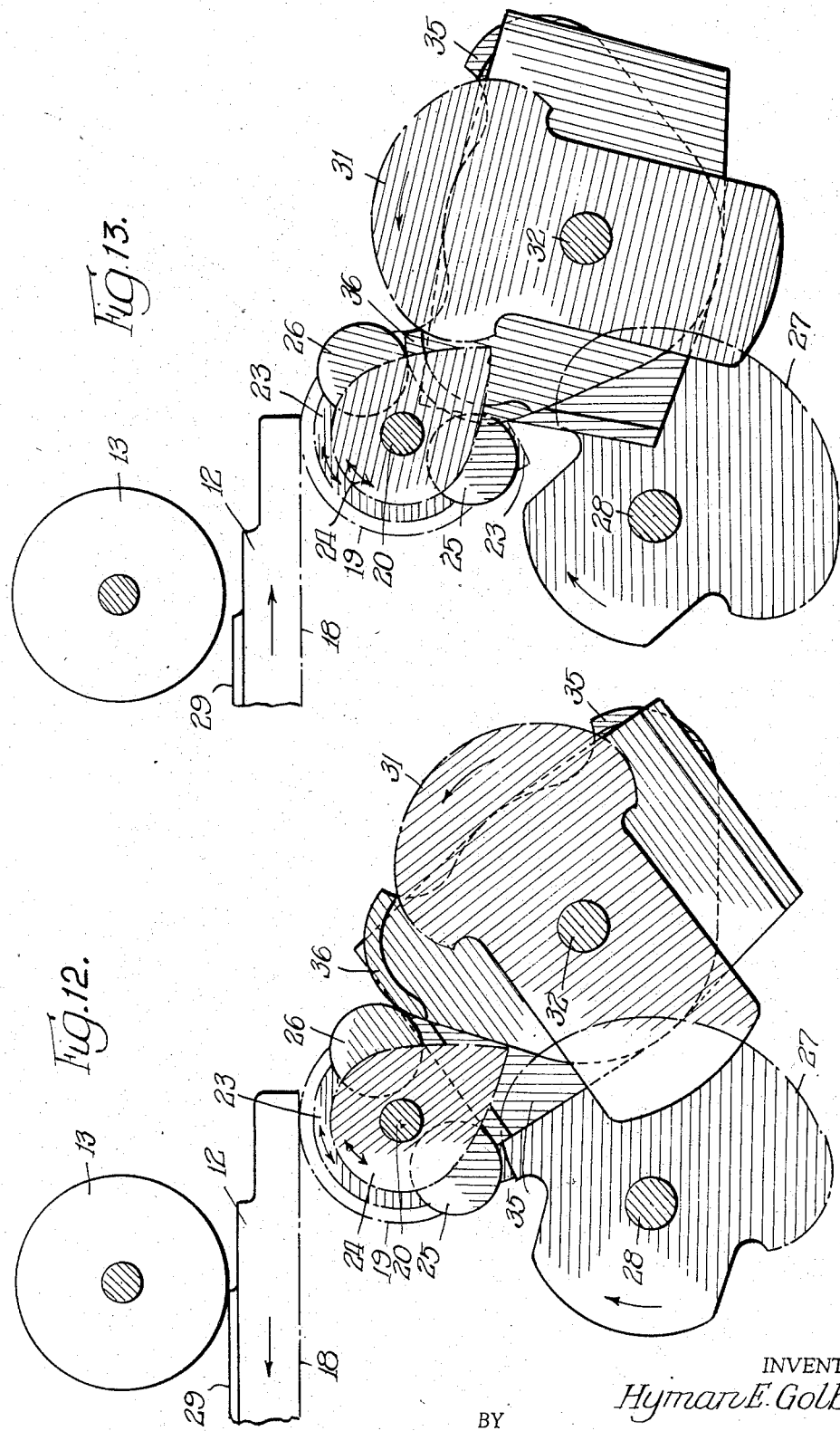

Patented Aug. 22, 1944

2,356,156

UNITED STATES PATENT OFFICE 2,356,156

BED MOTION MECHANISM

Hyman E. Golber, Chicago, Ill., assignor to Miehle Printing Press and Manufacturing Company, Chicago, Ill., a corporation of Illinois Application March 16, 1940, Serial No. 324,290

29 Claims. (Cl. 74—27)

My invention pertains to improvements in mechanical movements whereby a uniform, rotary motion of one element shall be converted into a given, linear motion, preferably of non-uniform character, which is to be imparted to another element.

The invention is more particularly adapted for use in that class of machinery where large masses are to be reciprocated at high velocities, and where such masses must be retarded, stopped and accelerated in the opposite direction within a limited period of time at the end of each reciprocatory stroke.

Such requirements are found for instance in printing presses of the flat bed, cylinder class, where the type bed travels at uniform speed during actual printing and is then decelerated and stopped and thereupon reversed to travel in the opposite direction at any desired speed by suitably accelerating the bed and then again decelerating it for its reversal prior to commencing its printing stroke.

Whatever the motion required to be transmitted to the type bed may be, it is extremely important that the change from one speed to another, such as during the reversal of the bed at the end of each stroke, shall be effected with the least degree of shock to the parts involved.

In my U. S. Letters Patent No. 2,253,270 issued August 19, 1941, for Gears, and the divisional Letters Patent No. 2,302,942 thereof, issued November 24, 1942, covering the method of making such gears, I have disclosed the characteristic features of a novel type of gear which I preferably term roll-curve gear, and I have also explained the definite steps involved in the method of producing said novel gears.

The outstanding advantage of my method and the roll-curve gears resulting therefrom, and which shall be defined herein in sufficient detail to render the present invention comprehensive, is that these gears make possible such movements of mechanical elements which are in exact accordance with the motion that has to be produced no matter what the nature of such motion may be, and which in the past presented a problem that could not be solved in a practical and reliable manner.

Heretofore, it was possible only to approximate any required, and more especially non-uniform linear motion that a designer intended to use for reciprocating any gear driven element.

By means of the method disclosed in said pending applications, it is now practical, and with comparative ease, to positively produce and to transmit with the aid of correlated driving and driven gears any definite motion represented in a designer's speedgraph, such as for instance a parabolic or harmonic motion, or combination thereof, as will become clearly evident.

While the herein described method, and resulting gears, may be utilized to great advantage in connection with innumerable motion producing mechanism, it is evident that the practical merits of such gears become more especially evident when applied in connection with bed motions of flat-bed printing presses, where the inclusion of a parabolic motion is particularly desirable, where marked variations in the velocities of the masses to be reciprocated occur, and where the linear displacement of such masses has to be accomplished at comparatively high speeds.

It is particularly essential in printing presses of the flat-bed class, where the masses to be reciprocated assume considerable proportions, that such masses shall be under postive control during their complete cycle of reciprocation. Preferably, the velocity of the type bed during its return, i. e. non-printing stroke, could be speeded up, thereby permitting of more favorable conditions during actual printing and resulting in an improved efficiency of the press without any appreciable increase in the press speed itself.

It is a fact also, that in the past the type bed reversing mechanisms in printing presses were to a great degree restricted to the use of those motions which are generated by means of different types of crank drives. In such case where the motion of the type bed during a portion of its stroke is intended to synchronize with a cylinder rotating at a uniform velocity, it is evident that crank drives have definite limitations.

In the realization of the above characteristics and desirable features, and the elimination of the disadvantages pointed out herein, much depends on the reliability and effectiveness of the train of mechanism for driving the type bed. It is readily apparent, therefore, that a mechanism which includes a train of gears whereby any given uniform and non-uniform motion, or combinations thereof, can be accurately produced and transmitted to a moving element, is particularly well adapted for use in bed motion mechanism.

Accordingly, it is one of the principal objects of this invention to provide a reversing mechanism for the type bed in printing presses in which the motion that is to be imparted to a reciprocating bed is definitely restricted to a specific law of acceleration and the mechanism has been designed and built so as to provide maximum efficiency for a given set of conditions such as length of stroke, length of uniform motion and permissible maximum forces.

A further aim is to provide a mechanism in which the forces are transmitted through a limited number of intermediate members, thereby minimizing the aggravated play or back lash in the cooperating machine elements and the resultant knocks.

Another salient feature of my invention is the provision of a bed motion mechanism for printing presses which shall include a train of roll-curve gears to provide the desired motion of the type bed during its reciprocatory cycle.

A further important object of the invention is a mechanical movement which will effectively absorb the forces set up by the reciprocating masses during the operation of the printing press.

Another object and characteristic feature of the present invention is to produce a bed motion mechanism whereby the type bed, during its return i. e. idle stroke, shall be accelerated above the speed given to the bed during its printing stroke, thereby increasing very considerably the output of the printing press.

An object also inherent to my invention is a speed ratio of the reciprocating element such that the maximum speed assumed by said element during its idle stroke is substantially two to one to that at which the element travels during its working stroke.

Another object of my invention resides in the provision of a bed motion mechanism which is devoid of any moving, heavy parts such as rack hangers, gates, etc. that require linear displacement during the running of a printing press.

A further object of the invention is to make possible an operating speed of flat bed printing presses heretofore not attained in presses of this type.

The invention also has for its object to provide a compact, self-contained driving unit which is limited in parts and capable of transmitting to a type bed all of its movements while the bed is under positive control.

A further object is the eliminating of shocks during the reversal of the bed at the end of each reciprocating stroke, and at any point where changes from one velocity to another of the driven element occur.

I wish to emphasize here that one of the ideal conditions attainable by the introduction of my invention into a bed motion of a flat-bed printing press is the combination of the desirable or good features of a parabolic motion with the desirable features of a harmonic motion. In other words, to provide in combination with a constant acceleration motion, a variable acceleration motion to join with a uniform motion.

Still further objects of and advancements made in the art by my invention will become apparent from the following specification read in conjunction with the accompanying sheets of drawings.

In these drawings, which illustrate one preferred embodiment of my invention:

Figure 1 illustrates an original and a modified so-called speedgraph; and,

Figure 2 portrays the pair of roll-curve gears produced;

Figure 3 depicts a designer's speedgraph which was developed in accordance with the method described in my Patent No. 2,302,942 granted November 24, 1942, for Method of Making Gears and which illustrates the curve of a given motion that is to be imparted to a reciprocating element;

Figure 5 is a partial section through the press taken in front elevation along line III—III of Figure 4 and viewed from the right thereof;

Figure 6 is an elevation, similar to Figure 4, but with some of the parts removed and taken along line IV—IV of Figure 5;

Figure 7 is a cross section taken through Figure 6 along the line V—V and viewed from the left side of Figure 6;

Figures 8 and 9 are sectional views taken along lines VI—VI and VII—VII respectively of Figure 4, seen from the right thereof; and, Figures 10, 11, 12, and 13 are diagrams which indicate graphically the position of the roll-curve gears and cooperating cams and cam rollers at different stages of the cycle of reciprocation of a type bed.

Figure 4:
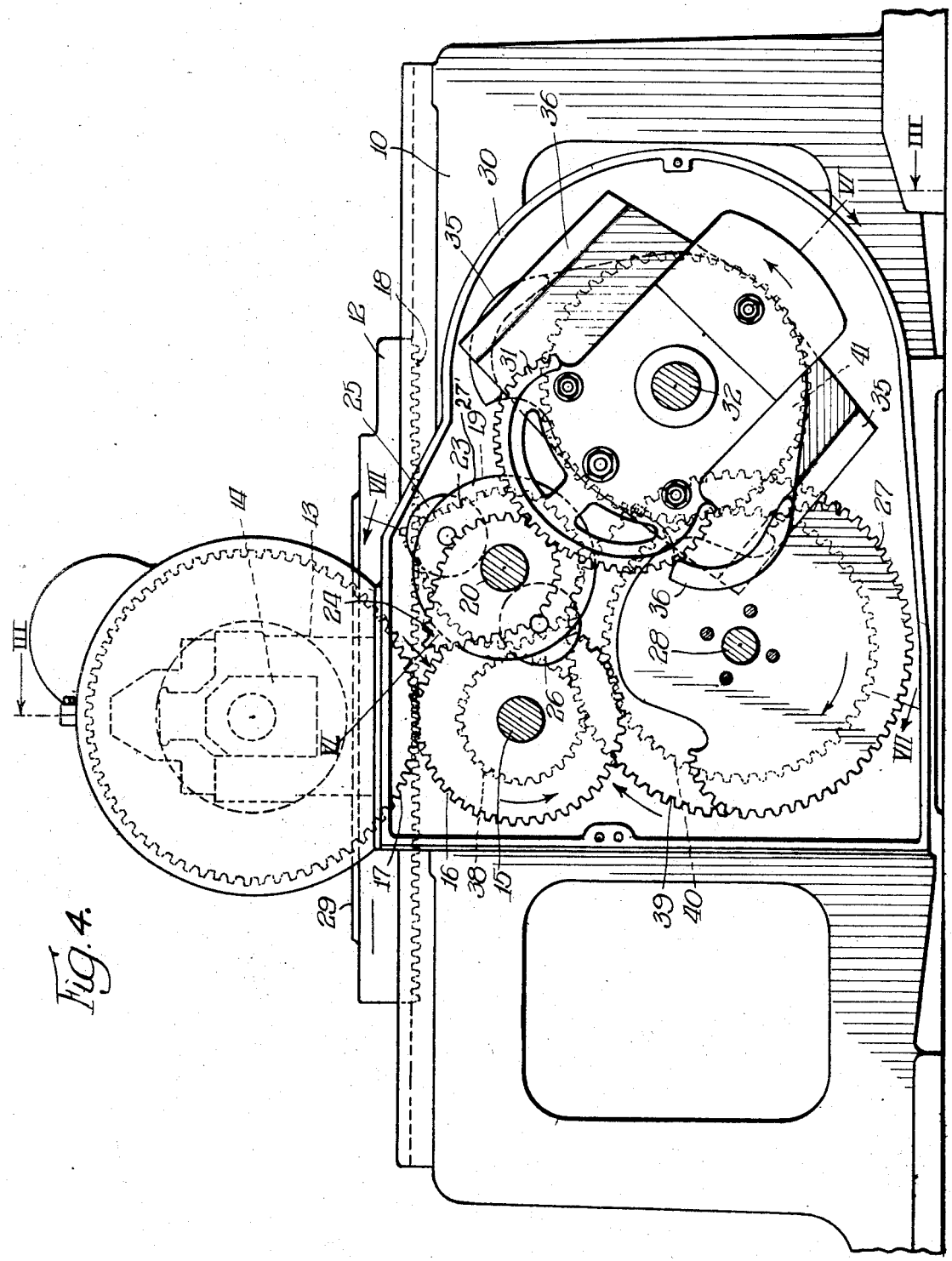
Figure 4 shows in front elevation the general arrangement of the cooperating parts such as I have provided in the form of a self-contained unit on the outside of one of the side frames of a printing press.

Because of the fact that the bed motion mechanism which constitutes the present invention, includes a train of gears which have roll-curve characteristics and thereby represents a practical embodiment of the advantages made available by the use of such gears, it is deemed desirable for a clearer understanding of my invention, to recite herein at least in part the essential novel features pertaining to this type of gears and to the method of producing them.

It shall be understood, however, that, while Figures 1 and 2 of the drawings depict one characteristic example of combined motions, such as for example parabolic and uniform motion, particularly suitable for embodiment in a mechanism for reciprocating the type bed of a printing press, any other combinations of motions may be restored to, without departing from the principle of the invention.

In the following description of the characteristic features inherent in the roll-curve gears and with the introduction of which I am able to readily produce any desired mechanical movements such as for example a parabolic bed motion, which may or may not include any harmonic motion, for flat-bed printing presses, the following definitions should be kept in mind, namely: acceleration is the rate of increase of speed, deceleration is the rate of decrease of speed, displacement is the change of position with the element of time omitted, speed is the rate of change of displacement, and impulse is the rate of change of acceleration or deceleration. The term parabolic means a particular kind of non-uniformity where the change is according to the square of the time.

Let it be assumed that the problem to be solved is the production of a parbolic bed motion which includes a pair of correlated driving and driven spur-gears of which the former is to rotate at a uniform speed and the latter is to revolve at a speed which, for a portion of the time at least, is variable in order to produce required non-uniform movements.

Accordingly, using a rectilinear-system of coordinates, a speegraph line is drawn representing the needed speed characteristics of the driven-gear to be provided, and in Figure 1 such a line is shown partly in full line and partly in dotted lines.

In such Figure 1, the horizontal base-line 100—110—120—130—140—150—160—170—180—190 represents zero speed, distances above such base-line delineating follower or driven gear rotation in the opposite direction so that of the driving-gear and distances below such base-line denoting driven-gear rotation in the same direction as that of the driving-gear.

Line 100—120—19—14—15—21—170—180 depicts the required speed rotation of the follower or driven gear to be supplied, the line 170—180—120 portraying a period of dwell or non-rotation of the follower-gear, the two ends of the line characterized 100, 100 representing the same single point; that is to say, the follower does not rotate for the period represented by the space 170—100—120.

That straight portion 120—19 of the line indicates a uniform acceleration of rotation of the follower-gear, in other words, a parabolic angular-displacement of the gear around its axis; the horizontal part 19—21 of the line designates a uniform rotation of the follower or driven gear at the highest speed reached at the end of the acceleration; and the straight section 21—170 of the line depicts a uniform deceleration or parabolic decrease of angular-displacement of the rotating follower-gear.

In drawing such a speedgraph, any unit of length is arbitrarily chosen to represent the known uniform rotational speed of the driving-gear, and the vertical speed-ordinates of the follower-gear line of the speedgraph are of lengths based upon such unit of length, the latter being shown in Figure 1 as line 100—22.

It is to be particularly noted that in this speedgraph the periods of parabolic angular-displacement of the driven-gear are not denoted by curved or parabolic lines, but rather by straight inclined or sloping lines 120—19 and 21—170 indicative of uniform change of speed.

The point 19, therefore, depicts a sudden termination of the constant substantial acceleration of the follower-gear and an abrupt institution of its uniform speed of rotation, which more or less violent transition, if it were allowed to occur, would create a shock in the mechanism with resulting detrimental effect, especially in a machine requiring great accuracy in the movements of its parts, as, for example, in a printing press where registration of printing or positioning of sheets of paper are of prime importance.

The point 21 represents a similar but reverse shock-creating condition, that is to say, the quick ending of its uniform-speed revolution and the instant establishment of its period of its uniform deceleration at a material rate.

It is to be understood further that the area beneath the line 120—19 or 19—21, or 21—170 represents the angular-displacement of the follower-gear, and this, of course, is true of any portions of such lines, the total area 120—19—21—170—120 corresponding to 360 degrees of rotation of the follower-gear.

To avoid such abrupt or quick changes of rotation of the follower or driven gear, portrayed by the cusps 19 and 21, it becomes desirable or necessary to eliminate these cusps by the substitution of curves therefor, but, inasmuch as the areas below such curves must be dealt with in the development of the roll-curve for the driven-gear, it is of great importance that the curves chosen shall be such as (a) to facilitate or even make possible the ready ascertainment of the whole or partial area below the complete curve or section thereof, and (b) to be consonant or compatible with the functioning capacity of available gear-tooth cutting-machines.

I have discovered that the best curve to employ for this purpose, and for the accomplishment of the above-stated and other objects, is a parabola with its axis at right-angles to the horizontal base-line, such curve providing a constant rotational impulse to the follower-gear.

Such parabola should be preferably relatively large, rather than small, in order to afford smooth action of the gears, and to aid in the cutting of the gear-teeth, and it may be readily computed and drawn, requiring no reference to trigonometric tables.

The parabola so selected may depend somewhat upon the desired requirements in the finished machine, bearing in mind that the companion driving-gear must cooperate with the final follower or driven-gear at these points, and remembering the facilities available for cutting the gear-teeth, etc., but no difficulty will be experienced by one skilled in the art in providing such cusp-eliminating parabolas.

The parabola so employed will, in each instance, be tangent to both of the lines which it connects, thus assuring no drastic or undue changes of acceleration of the follower-gear.

In Figure 1 the speedgraph has been modified to indicate the employment of parts of two suitable parabolas to remove the cusps referred to, and, in such figure, the parabolic lines 13—14 and 15—16 have been introduced to take the place of the upper portions of the lines 120—19 and 21—170 and the opposite end portions of the line 19—21.

In the final speedgraph chart, it is to be remembered that the ordinates of the curve represent speed, the area beneath the curve angular-displacement, and the grades of the curve acceleration or deceleration, as the case may be.

From this new altered speedgraph curve or line 100—110—13—14—15—16—180—100, and in which the ordinates 14—140 and 15—150 represent the axes of the two parabolas, it will be seen that the constant acceleration or parabolic angular-displacement, indicated by the straight, sloping line 110—13, is gradually and smoothly modified, as represented by the parabolic line 13—14, so that, although acceleration continues from 13 to 14, it is no longer constant but rather decreasing and of a type best described as variable acceleration or harmonic motion, and, at the point 14, such acceleration becomes zero and the motion of the follower-gear transformed into a uniform speed represented by the line 14—15.

Again, such uniform rotational speed of the driven or follower gear is ended at the point 15 and deceleration thereof instituted gradually and smoothly and then more or less rapidly increased, as represented by the parabola section 15—16, and at the point 16, such deceleration becomes and continues constant and unvarying until the beginning of the dwell at the point 180.

It should be observed that at each of the points 13, 14, 15 and 16 the parabolas are tangent to the lines 110—13, 14—15, 15—14 and 16—180, respectively.

Just how such parabolas shall be employed to cut off the cusps in the speedgraph may depend upon any one of several factors.

In the present case let us assume that the length of the uniform speed line 19—21 is not absolutely essential to obtain the required operation of the parts actuated by the driven or follower gear and that the rapidity of acceleration and deceleration, as represented by the lines 120—19 and 21—170, may be slightly changed without interfering with the successful operation of the machine.

To produce this result, the section of the parabola 13—14 is introduced into the speedgraph with the vertex of the parabola at the point 14, and the slope of line 120—19 is decreased slightly, so that the parabola is tangent to the line 14—15 and also tangent to the new line 110—13, the inclination of line 120—19 having been changed just enough so that the area 110—13—14—140—130—110, representing angular-displacement of the driven-gear, in the final speedgraph, is exactly the same as the original area 120—19—14—140—130—120.

As is fully shown, this change of inclination is brought about by shifting the intersection of line 19—120 with the base-line at the point 120 slightly to the left to point 110 and terminating the new straight inclined line at the point 13.

As will be readily understood, another section of parabola 15—16 is similarly introduced into the diagram to eradicate the cusp at 21.

If it were essential to maintain the length of line 19—21 to secure a predetermined period of constant speed of the driven-gear and it were permissible to change the period of, or rate of, acceleration and deceleration, the lines 120—19 and 21—170 would be correspondingly modified to permit the introduction of the parabolas.

Or, in some cases, the length of the area 14—15—150—140 under the new curve or line may be increased in very minor degree to keep the total area under the follower-gear curve the same as in the original speedgraph.

One acquainted with, and skilled in, this art will encounter no substantial difficulties in removing the cusps by the adoption and introduction of the parabolas and at the same time preserving the required irregular rotation of the follower-gear to be produced.

In every instance, the parabola employed has its axis vertical, that is at right-angles to the base-line, to facilitate mathematical calculation, rather than resorting to complicated formulæ or trigonometric tables.

Actually, in this speedgraph chart of Figure 1, the total angular-displacement of the driving gear should be represented by the area of a rectangle having a length represented by the full length of the base-line 100—100 and having a height 100—22, but, inasmuch as the base-line itself can be conveniently used for such representation, because its various sections are directly proportional to the corresponding areas, it is hereinafter so employed.

Accordingly, the several portions of the horizontal base-line, the total length of which corresponds to the 360 degrees of uniform rotation of the driving-gear of the pair, represent as follows in this particular example:

```
100—110 =  29.6388885 degrees
110—130 =  40.0000000 degrees
130—140 =  40.0000000 degrees
140—150 = 140.7222230 degrees
150—160 =  40.0000000 degrees
160—180 =  40.0000000 degrees
180—100 =  29.6388885 degrees
```

The illustrated vertical ordinates of the follower-gear curve of Figure 1 are as follows and their values show their proportion of the unit-speed ordinate 100—22 of the driving-gear:

```
130—13 = 1.00628931
140—14 = 1.50943396
150—15 = 1.50943396
160—16 = 1.00628931
```

As the line portion 180—100—110 is a dwell for the driven-gear, point 129 (Figure 2) on the dotted extension of the roll-curve of the latter would have to be kept at the driving-gear axis, and this would be quite unsatisfactory for several reasons.

Therefore, the dwell part is mechanized, not by roll-curve gears, but by cams and roller arms.

Moreover, the gear portions on line 110—13 near the point 110 and on line 16—180 near the point 180 are not satisfactory because the gears would unmesh, and so the cam and roller drive is made to provide also for the disadvantageous lower portions only of lines 110—13 and 16—180.

It has been indicated previously that the cusps are to be removed from the speedgraph and yet two remain at 110 and 180, these two occurring, not on the gear-portion, but on the cam portion, as just stated above, when the follower-gear speed is very low; yet in some speedgraphs even the speed-zero cusps are rounded out.

Now for each degree of turn of the driving-gear beginning at zero at the point 100 (left-hand end of the line), for each corresponding ordinate of the follower-gear curve

100—110—13—14—15—16—180—100 the total area beneath such curve to the left of such ordinate represents the total amount of angular displacement or turn of the driven-gear. In mathematically determining such areas under each parabola, one starts with the axis (14—140 or 15—150) of the parabola and works backwardly for the parabola 13—14 and forwardly for the parabola 15—16 as otherwise the computation would perhaps be unduly complex.

For example, the driven-gear does not begin to rotate until the driving-gear has turned 29.6388883 degrees corresponding to the point 110, and, while the driving-gear revolves the next 40 degrees, as represented by that portion of the base line 110—130, the driven-gear must rotate an amount corresponding to the area

110—13—130 which is determined in this manner:

Area 110—13—130 = ½ × (110—130) × (130—13)
Area 110—13—130 = ½ × 40 degrees × 1.00628931
Area 110—13—130 = 20.1257862 degrees In this connection it must be appreciated that, although the length of line 110—13 is greater than the length of the line 110—130, nevertheless the driven-gear is rotated a lesser amount during the rotation of the driving-gear than that of such driving gear, this being due to the fact that whereas the length of line 110—130, as we are now considering it, represents the extent of rotation of the driving gear, the area beneath line 110—13 represents the rotation of the driven-gear during the same period.

If, however, we were comparing the actual area of the driving-gear rectangle having a base 110—130 and a height 100—22 with that of the driven-gear triangle 110—130—13 the relative angular-displacements of the two gears during the same period of time would be more obvious.

The line 130—140 depicts a turning of the driving-gear of 40 degrees and, during such rotation thereof, the driven gear will be revolved an amount corresponding to the area

130—13—14—140 which is computed in known manner thus:

Area 130—13—14—140 = ⅓ × (130—140) × ((130—13) + 2(140—14))
Area 130—13—14—140 = ⅓ × 40 degrees × ((1.00628931) + 2(1.50943396))
Area 130—13—14—140 = 53.66876305 degrees Further, while the driving-gear turns the next 140.7222230 degrees, represented by the line 140—150, the driven gear will be rotated 212.4109023 degrees in accordance with the rectangular area 140—14—15—150.

When the driving-gear rotates the succeeding 40 degrees, in correspondence with line 150—160, the driven or follower gear revolves 53.66876305 degrees, and, while the driving-gear thereafter turns 29.6388885 degrees, denoted by line 160—180, the companion driven-gear turns 20.1257862 degrees.

By this time, the driven-gear has completed its single 360 degree revolution, and it dwells or remains stationary during the period the driving-gear turns two times 29.6388885 degrees, that is 59.2777770 degrees, represented by the combined lines 180—100—110.

As will be readily understood, the area beneath the straight sloping line 110—13 represents a uniform acceleration of the driven-gear, the area beneath the section 13—14 of the vertical parabola corresponds to a constant impulse resulting in a graduated reduction of the acceleration, whereby the rotation of the driven-gear reaches a uniform or unvarying speed at the point 14, which condition persists, as represented by the rectangle 140—14—15—150, until point 15 is reached, whereupon the speed of the driven-gear is decelerated at a gradually increasing rate, which, at the point 16 becomes a uniform deceleration until point 180 is reached, where such deceleration has brought the driven-gear to a standstill.

Machines are assumed to be built of rigid material, as for example, cast-iron, but, of course, in reality there is no such thing as an absolutely rigid material, that is every body bends in some degree when forces are applied to it, the amount of bending being proportional to the stress to which it is subjected.

Since in a machine, the inertia forces are proportional to the square of the machine-speed, such bends of its parts created by such forces are proportional to the square of the machine-speed times acceleration.

At every speedgraph cusp, the bodies would have two different bendings corresponding to the different grades of the lines meeting at the cusp, and, since it frequently happens that the bodies are considerably resilient they would bend sufficiently to cause misplacement of the parts, and, at high speed, would "knock" and result in defective operation of the mechanism.

Such troubles are eliminated by the practice of the present invention based on the removal or avoidance of cusps in the speedgraph curve.

The following table may be of assistance in analyzing what happens to the driven-gear at different parts of the speedgraph-chart:

such pair of gears is produced from the speedgraph of Figure 12.

For each degree of rotation of the driving-gear, as indicated by the line 100—100, the corresponding amount of turning of the driven-gear is determined mathematically in the same general manner as indicated above for the particular points 110, 130, 140, 150, 160, 180, so that for each added degree of turning of the driving-gear, from its starting point, the total amount of turning of the driven-gear will be known.

It can be readily demonstrated that with these roll-curve gears, the ray (not radius) (R for the driving-gear and r for the driven-gear) from the axis of the gear around which it revolves to its roll-curve at any point of the latter is for the driving-gear represented as follows:

R=constant distance between the axes of rotation of the two gears (L=in this case 16.625 inches) multiplied by the speedgraph ordinate (S) corresponding to the angle or the ray and such product divided by 1 (one) plus the same speedgraph ordinate (S) and the equation may be written thus:

$$R=\frac{LS}{1+S}$$

and similarly the equation for the ray of the driven or follower gear may be expressed thus:

$$r=\frac{L}{1+S}$$

The roll-curve for the driving-gear may be plotted on a sheet of paper by drawing 360 rays from a common center one degree apart and marking on each such ray line the proper length thereof as determined by the above-noted formula, and then by drawing a line through all of these points, such line will represent the roll-curve for the driving gear.

Instead, however, of thus plotting such roll-curve by drawing the diverging rays from a common center one degree apart, the many successive points defining the roll-curve may be plotted by means of a system of rectilinear-coordinates.

The driven-gear roll-curve may be plotted in a similar manner by drawing the 360 radiating rays equally spaced and marking thereon the points determined by the formula stated above, or the rays may vary as to the degrees or angle between them as determined for each degree of turning of the driving-gear and the marks applied to such rays.

In either case, a line drawn through the successive marks or points results in the driven-gear roll-curve.

Instead of using rays for the location of such roll-curve points, a system of rectilinear-coordinates may be resorted to.

I have indicated herein that one of the outstanding advantages characteristic of a bed mo-

| Speedgraph | Displacement | Speed | Acceleration | Impulse |
|---|---|---|---|---|
| Horizontal zero line | 0 | 0 | 0 | 0. |
| Horizontal upper line | Changes at uniform rate | Remains constant | 0 | 0. |
| Oblique straight lines | Parabolic | Changes at uniform rate | Remains constant | 0. |
| Parabolas | Cubic | Parabolic | Changes at uniform rate | Remains constant. |

In Figure 2, the driving-gear 131 and its attendant or mating follower or driven-gear 132 are shown in meshed relation, in this particular or specific example with a fixed distance of 16.625 inches between their axes 133 and 134 respectively, about which they are designed to revolve.

We will now consider the manner in which tion which embodies my invention is the fact that the desirable, or good features of a parabolic motion and the desirable features of a harmonic motion are retained and combined to join with a uniform motion, whereas the undesirable, or bad points of a parabolic and of a harmonic motion are discarded.

A parabolic motion provides a constant, but smallest possible acceleration for a given stroke, while a harmonic motion has a very gradual change in acceleration when running into, i. e. joining, a uniform motion. These points are desirable and, therefore, are being retained, whereas the bad points of sudden change in acceleration in a parabolic motion when joining a uniform motion, and that of a high force at the end of a stroke in a harmonic motion, are omitted.

Referring again to the speedgraph depicted in Figure 1, I have indicated zones A, B, C, D, and E. Zone A represents the constant, parabolic acceleration at the beginning of the printing stroke of a type bed for example.

Zone B corresponds with the harmonic motion when, near the beginning of the uniform speed of the bed, the acceleration changes at a substantially constant rate, which preferably could be termed variable acceleration.

The uniform speed of the bed, when printing takes place, is represented by zone C.

At the end of such uniform speed, the travel of the bed is decelerated and the motion becomes harmonic, in other words deceleration changes at a substantially constant rate. This phase of the motion is indicated by zone D.

The printing stroke is subsequently ended with a constant deceleration which becomes parabolic and which is depicted by zone E.

In practice, it has been found that, in place of the retained features of a harmonic motion, one could use to great advantage a suitable cubic parabola with its origin at the beginning of the uniform speed.

The acceleration resulting from such an alternative has a positively constant rate of change and the calculations required are considerably simplified.

In order to make the principle of my invention more readily understood, I will now give a brief explanation of the designer's speedgraph depicted in Figure 3 of the attached drawings.

In that speedgraph the abscissae or horizontal dimension represent the time, usually in degrees of rotation of the driver, the areas between the curve and the horizontal base line represent the displacement of the follower, the ordinates show angular speed of the follower, and the slope of the curve indicates the rate of acceleration or deceleration.

The curve 100'—110'—140—180'—220—250'—100' represents the complete cycle of reciprocation that is to be imparted to a type bed of a printing press.

The ordinate 100—100' indicates the maximum speed attained during the printing stroke which speed remains uniform while the actual printing takes place, whereas the ordinate 180—180' represents the maximum speed reached during the non-printing i. e. return stroke of the type bed.

It will be seen that at point 110 the slowing down of the type bed begins, it continues until its speed is nil at point 140. There the direction of travel of the bed is reversed to commence its return or idle stroke. From point 140 on the bed is accelerated until it reaches its maximum speed at point 180', where the speed ratio is approximately 2 to 1 as compared with the uniform printing stroke of the bed. I wish it to be understood that this particular ratio is preferred when my invention is applied to the driving mechanism for a reciprocating type bed, but that any desired modification in the speed ratio may be adopted without departing from the scope of this invention.

At point 180' the deceleration of the bed begins until at the point 220 the bed reverses. The bed continues to travel in the reversed direction until the point 250' is reached, where the bed assumes its uniform or constant speed for the actual printing period, which extends from point 250'—100'—110'.

If in the speedgraph, depicted in Figure 3, the curve would have been composed so as to include the intersecting broken lines A—B, C—D and E—F, then it would have given rise to the production of roll-curve gears having cusps, such as are disclosed for example in my U. S. Patent No. 2,027,818, Drive mechanism, issued January 14, 1936, which shows a number of different gear segments assembled to form a pair of gears whereby a given, non-uniform motion to be imparted to a machine element may be approximated. Such cusps are highly objectionable, both from a manufacturing standpoint as well as in the actual operation of a mechanism, because they will produce shocks and knocks unless such gears are made exceedingly rigid and accurate.

The method which I employ to eliminate such objectionable cusps and therewith avoid any shocks resultant due to such cusps, is described in full details in my pending application for U. S. Letters Patent identified above, and therefore need not be dealt with here.

Referring now to the practical embodiment of the invention, the printing press to which my improved mechanical movement is applied by way of example, includes side frames 10, 11, a type bed 12 and an impression cylinder 13, see Figure 4. The latter is mounted for rotation in bearing blocks 14 slidably arranged in said frames in a manner that the cylinder may be tripped by raising it off the type bed during the non-printing period of the press. In a two-revolution press, the impression cylinder rotates continually in one direction and it makes two revolutions per printing cycle, one during the impression stroke and the other during the return stroke of the bed. The cylinder is driven from the main drive shaft 15 through the intermediary of the driving gear 16 mounted on said shaft and meshing with the cylinder gear 17, the source of power being of any suitable kind, such as an electric motor, not shown.

As illustrated in Figures 4 and 5, on the underside of the bed 12 there is provided a rack 18 which extends longitudinally of the bed and meshes with a driving gear 19 carried by the bed motion shaft 20. This gear is the only member acting on the bed to drive it throughout its entire cycle of reciprocation, having the reciprocating type bed under positive control at all times by always remaining in mesh with the rack.

The inner end of the shaft 20 is supported in a bearing 21 provided in a brace member 22 of the press frame. The other bearing for said shaft is arranged in the side frame 10, through which the shaft extends. Its free end carries two roll-curve gears 23 and 24 and a pair of cam rollers 25 and 26 which rotate freely on studs mounted in discs 25', 26', and 27' rigidly associated with the shaft 20, see Figure 9. The gear 23 meshes intermittently with a companion roll-curve gear 27, which I term the direct driver and which is secured to the "direct" shaft 28 mounted for rotation in bearings provided in the gear case 30. The gear 24 moves intermittently into meshing relation with a roll-curve gear 31, which I term the reverse drive gear and which is rigidly mounted on the "reverse" shaft 32 which also has its bearings in the gear case 30.

Rigidly interlocked with the roll-curve gear 31 and carried by the shaft 32 are two cam members, which I call "node cams" 35 and 36, the former cooperating with cam roller 25 and the latter with cam roller 26 for the purpose of controlling and completing the motion of the type bed 12 during its reversal and at the moment when neither the gears 23 and 27 nor the gears 24 and 31 are in meshing relation, as will be more readily understood from the mode of operation explained hereinafter.

The main drive shaft i. e. power shaft 15 also carries a gear 38 which meshes with a gear 30 mounted on the shaft 28 which also has rigidly secured thereto a gear 40, see Figure 6, and which latter is in constant meshing relation with a gear 41 keyed to the shaft 32. These latter two gears I preferably term "cycle gears" to distinguish from roll-curve gears. It will be seen therefore that when the press is in operation, the shafts 28 and 32, and therewith the gears 40 and 41, rotate constantly and at the same rate of speed but in opposite directions, and that the shaft 20 will be driven alternately by said shafts 28 and 32, namely in an anti-clockwise direction during the printing stroke of the bed, at which time the gears 23 and 27 are in mesh, and in a clockwise direction when the gears 24 and 31 are in mesh during the return stroke of the bed.

The position of the roll-curve gears, node cams and associated rollers as viewed in Figure 4, correspond with the maximum speed of the type bed 12 reached during its return stroke when the cylinder is tripped and no printing takes place, the bed having reached the crest of said stroke and the roll-curve gears 24 and 31 being in mesh, which position coincides with point 180' of the speedgraph depicted in Figure 3. At this point, of course, the roll-curve gears 23 and 27 are not in mesh and the rollers 25 and 26 are not in rolling contact with their respective cams 35 and 36, the type bed 12 at that moment has reached the middle of its return stroke.

With a view of rendering more apparent the manner of operation of my novel mechanical drive, I will now turn to Figures 10, 11, 12 and 13 which illustrate graphically various positions of the roll-curve gears and associated parts assumed during the cycle of reciprocation of the type bed 12. In these figures the radii shown of the gears involved are terminated at the pitch lines of the gears, therefore, where the pitch lines touch, the gears are intended to be in mesh and vice versa, and each pair of correlated gears, as well as the pairs of cooperating cams and rollers are shade lined alike in order to facilitate a clear understanding of their correlations and actions.

In Figure 10, which depicts the position of the parts at the time when the type bed nears the end of its return stroke and just prior to its reversal and acceleration for the printing stroke, the gears 24 and 31 are just moving out of mesh and the rollers 25 and 26 are already in rolling contact with their co-acting node cams 35 and 36, the shaft 20 up to this time having been driven in a clockwise direction.

During the continued rotation of the shaft 32 in the anti-clockwise direction, the shaft 20 will therefore not continue to rotate in a clockwise direction but its direction of rotation will be reversed gradually because the cam 36 during its rotation towards the roller 26 will urge the latter to the left thereby initiating rotation of the shaft 20 in an anti-clockwise direction. By the time both of the rollers have reached the ends of their respective cam tracks, the roll-curve gear 27 will have advanced sufficiently to move into meshing relation with its correlated gear 23 and the acceleration of the bed will be continued until the uniform type bed velocity is reached, namely at the point 250' of the speedgraph curve shown in Figure 3. The rollers 25 and 26 having in the meantime moved clear of their cams so that the bed will now be under control of the gear 27 only. The period of action of the node cams 35 and 36 from the time their cooperating rollers engage them, to the moment the rollers leave said cams, is represented by the section 210' to 230' of the speedgraph curve depicted in Figure 3.

At the moment when the bed 12 has reached the middle of its uniform stroke, the roll-curve gears and associated cams and rollers shall have assumed the relative positions shown in Figure 11, namely positions when the gears 23 and 27 are in mesh, the gears 24 and 31 are out of mesh, and the cam rollers are not in rolling contact with their respective cams.

Figure 12 illustrates the position of the parts assumed just prior to the end of the printing stroke. The roll-curve gears 23 and 27 are still in mesh, the rollers 25 and 26 have already reached the node cams 35 and 36 respectively. The type bed 12 has almost completed its printing stroke, namely to the left as viewed in this figure, and the impression cylinder is about to be tripped out of printing relation with the form 29.

As soon as said rollers have engaged their cams, so that the shaft 20 and therewith the rack pinion 19 and bed 12 are under positive control of said rollers and cams, the gears 27 and 23 will move out of their meshing relation and for a moment the gear 23 will continue to rotate in an anti-clockwise direction due to the action of the node cam 36 on the roller 26 urging the latter to the left. This movement continues until just prior to reaching the position represented in Figure 13. It will be seen that the roller 26 has proceeded a short distance beyond the high point of the cam 36 and that due to the engagement of cam 35 with the roller 25 and the continued rotation of said latter cam in an anti-clockwise direction, the latter roller is being urged to the left, swinging the two rollers in a clockwise direction about the axis of shaft 20, thereby maintaining rolling contact between the roller 26 and its cam 36 and in consequence thereof initiating the rotation of said rollers and shaft 20 in the clockwise direction and therewith commencing the return stroke of the bed, namely to the right as viewed in Figure 13. Therefore, at the moment the gears 31 and 24 begin to mesh, the latter gear already has commenced to rotate in the direction it will be driven by the reverse drive gear 31. According to the position shown in Figure 13, said two gears are not yet in mesh but shall be so after a slight further movement of the gear 31 in the direction shown by the arrow. The period of action of the node cams during that portion of the cycle of operation just described, namely from a point considerably prior to the end of the printing stroke to a point considerably after the return stroke of the bed begins, is represented by the section 130' to 150' of said speedgraph curve. Thereupon the bed shall be under control of the reverse drive gear as shown in Figure 4 until the bed has again reached the position indicated in Figure 10.

It is apparent, therefore, that the combination of parts described herein is capable not only of producing the required movements of a mechanical element, but also will assure a rigid connection between cooperating parts at all times during the operation of such element and will eliminate any shocks that heretofore have occurred during changes in the velocity of an element, due to forces set up by the reciprocating masses in mechanisms such as bed motions of type beds in printing presses.

I claim:

1. In a bed motion mechanism, the combination with a reciprocating bed, of a bed motion gear constituting the only drive applied to said bed during its complete reciprocatory cycle, a bed motion shaft carrying said gear and driving the gear and the bed in opposite directions, two roll-curve gears on said bed motion shaft, a second shaft continually rotating at uniform speed in one direction and having a roll-curve gear thereon for meshing relation with one of said two roll-curve gears, and a third shaft having a roll-curve gear thereon for meshing relation with the other one of said gears on said bed motion shaft, said second and third shaft transmitting to said bed its complete motion.

2. In a bed motion mechanism, the combination with a reciprocating bed, of a bed motion gear constituting the only drive applied to said bed during its complete reciprocatory cycle, a bed motion shaft carrying said gear and driving the gear and the bed in opposite directions, two roll-curve gears on said bed motion shaft, a second shaft continually rotating at uniform speed in one direction and having a roll-curve gear thereon for meshing relation with one of said two roll-curve gears, and a third shaft having a roll-curve gear thereon for meshing relation with the other one of said gears on said bed motion shaft, said second and third shafts having associated therewith means whereby rigid connection will be assured between the cooperating parts during the changes of movement of said reciprocating bed.

3. In a bed motion mechanism, the combination with a reciprocating bed, of a bed motion gear constituting the only driving member applied to said bed during its complete reciprocatory cycle, a bed motion shaft carrying said gear and driving the gear and the bed in opposite directions, two roll-curve gears on said bed motion shaft, a second shaft continually rotating at uniform speed in one direction and having a roll-curve gear thereon for meshing relation with one of said gears on the bed motion shaft, and a third shaft continually rotating at uniform speed in the opposite direction and having a roll-curve gear thereon for meshing relation with the other one of said gears on the bed motion shaft, said second and third shafts having associated therewith means whereby rigid connection will be assured between the cooperating parts during the changes of movement of said reciprocating bed.

4. In a flat-bed printing press, a type bed traveling at a uniform speed during the printing stroke and having a bed rack and gear for driving the bed, a bed motion shaft for said gear, the drive for said shaft being composed of two equal, meshing and continuously rotating cycle gears rotating at a uniform speed, one of the cycle gears carrying a roll-curve gear for the printing stroke and the other carrying a roll-curve gear for the return or idle stroke, and a complementary roll-curve gear on the bed motion shaft for each of said roll-curve gears on the cycle gears, a pair of cams associated with at least one of said cycle gears, and a pair of rollers on the bed motion shaft cooperating with said cams for completing the motion at the points of reverse.

5. In a printing press, a type bed, mechanism for imparting reciprocatory movement to said bed and including a driving shaft, two driven shafts geared for uniform rotation at the same speed but in opposite directions, a bed motion shaft and gear thereon for driving the bed, a pair of roll-curve gears carried by said latter shaft, a roll-curve gear on one of said driven shafts complementary to one of said pair of gears for driving the bed during its printing stroke, and a roll-curve gear on the other one of said driven shafts complementary to the other one of said pair of gears for driving the bed during its non-printing stroke.

6. In a printing press, a type bed, mechanism for imparting reciprocatory movement to said bed and including a driving shaft, two driven shafts geared for uniform rotation at the same speed but in opposite directions, a bed motion shaft and gear thereon for driving the bed, a pair of roll-curve gears carried by said latter shaft, a roll-curve gear on one of said driven shafts complementary to one of said pair of gears for driving the bed during its printing stroke, and a roll-curve gear on the other one of said driven shafts complementary to the other one of said pair of gears for driving the bed during its non-printing stroke at a speed different to that imparted to the bed during its printing stroke.

7. In a printing press, a type bed, mechanism for imparting reciprocatory movement to said bed and including a driving shaft, two driven shafts geared for uniform rotation at the same speed but in opposite directions, a bed motion shaft and gear thereon for driving the bed, a pair of roll-curve gears carried by said latter shaft, a roll-curve gear on one of said driven shafts complementary to one of said pair of gears for driving the bed during its printing stroke, and a roll-curve gear on the other one of said driven shafts complementary to the other one of said pair of gears for driving the bed during its non-printing stroke at a speed different to that imparted to the bed during its printing stroke, the ratio of the maximum speed during the return stroke being substantially two to one to the constant speed of the bed during its printing stroke.

8. In a printing press, a type bed, mechanism for imparting reciprocatory movements to said bed and including a driving shaft, two driven shafts geared for uniform rotation at the same speed but in opposite directions, a bed motion shaft and gear thereon for driving the bed, a pair of roll-curve gears carried by said latter shaft, a roll-curve gear on one of said driven shafts complementary to one of said pair of gears for driving the bed during its printing stroke, a roll-curve gear on the other one of said driven shafts complementary to the other one of said pair of gears for driving the bed during its non-printing stroke, a pair of cams on said last mentioned driven shaft, and a pair of cam rollers carried by said bed motion shaft and cooperating with said cams for completing the motion of said bed at the points of reverse.

9. In a printing press, a type bed, mechanism for imparting reciprocatory movement to said bed and including a driving shaft, two driven shafts geared for uniform rotation at the same speed but in opposite directions, a bed motion shaft and gear thereon for driving the bed, a pair of roll-curve gears carried by said latter shaft, a roll-curve gear on one of said driven shafts complementary to one of said pair of gears for driving the bed during its printing stroke, a roll-curve gear on the other one of said driven shafts complementary to the other one of said pair of gears for driving the bed during its non-printing stroke at a speed different to that imparted to the bed during its printing stroke, a pair of cams on said last mentioned driven shaft, and a pair of cam rollers carried by said bed motion shaft and cooperating with said cams for completing the motion of said bed at the points of reverse.

10. In a printing press, a type bed, mechanism for imparting reciprocatory movement to said bed and including a driving shaft, two driven shafts geared for uniform rotation of the same speed but in opposite directions, a bed motion shaft and gear thereon for driving the bed, a pair of roll-curve gears carried by said latter shaft, a roll-curve gear on one of said driven shafts complementary to one of said pair of gears for driving the bed during its printing stroke, a roll-curve gear on the other one of said driven shafts complementary to the other one of said pair of gears for driving the bed during its non-printing stroke at a speed different to that imparted to the bed during its printing stroke, a pair of cams on said last mentioned driven shaft, and a pair of cam rollers carried by said bed motion shaft and cooperating with said cams for completing the motion of said bed at the points of reverse, the ratio of the maximum speed during the return stroke of the bed being substantially two to one to the constant speed of the bed during its printing stroke.

11. In a bed motion mechanism, the combination with a reciprocating bed, of means including a bed motion shaft and gear thereon which constitute the only driving means applied to said bed during its complete reciprocatory cycle, a direct driving member, means for continually rotating said driving member at uniform speed in one direction, a reverse driving member, means for continually rotating said reverse driving member at uniform speed in the opposite direction, gears on said direct and reverse driving members respectively for controlling motion of the bed motion shaft to thereby drive the bed during the median portions of its reciprocatory cycle, and means including cams on the reverse driving member for controlling motion of the bed motion shaft to thereby reverse the movement of the bed at the ends of its reciprocatory cycle.

12. In a bed motion mechanism, the combination with a reciprocating bed, of means including a bed motion shaft and gear thereon which constitute the only driving means applied to said bed during its complete reciprocatory cycle, a direct driving member for the bed motion shaft, means for continually rotating said driving member at uniform speed in one direction, a reverse driving member for the bed motion shaft, means for continually rotating said reverse driving member at uniform speed in the opposite direction, and means on one of said members for controlling motion of the bed motion shaft to thereby stop and reverse the movement of the bed at the ends of its reciprocatory cycle.

13. In a bed motion mechanism, the combination with a reciprocating type bed, of mechanism for driving the bed during its reciprocatory cycle, said mechanism including elements constituting the driving means applied to the type bed during its complete sequence of strokes, and actuating means for said elements, organized and operating to impart to the type bed parabolic motion followed by harmonic motion during portions of each stroke of the bed.

14. In a bed motion mechanism, the combination with a reciprocating type bed, of mechanism for driving the bed during its reciprocatory cycle, said mechanism including elements constituting the driving means applied to the type bed during its complete sequence of strokes, and actuating means for said elements, including gears and cooperating cams, organized and operating to impart to the type bed parabolic motion followed by harmonic motion during portions of each stroke of the bed.

15. In a bed motion mechanism, the combination with a reciprocating type bed, of mechanism for driving the bed during its reciprocatory cycle, said mechanism including elements constituting the driving means applied to the type bed during its complete sequence of strokes, and actuating means for said elements, organized and operating to impart to the bed during one stroke thereof parabolic motion, harmonic motion and uniform motion in succession.

16. In a bed motion mechanism, the combination with a reciprocating type bed, of mechanism for driving the bed during its reciprocatory cycle, elements included in said mechanism which constitute the driving means applied to the type bed during its complete sequence of strokes, and actuating means for said elements for imparting to the type bed during one stroke thereof constant acceleration motion, variable acceleration motion and uniform motion in succession, whereby the variable acceleration motion joins the constant acceleration motion with the uniform motion.

17. In a bed motion mechanism, the combination with a reciprocating type bed, of mechanism for driving the bed during its reciprocatory cycle, elements included in said mechanism which constitute the driving means applied to the type bed during its complete sequence of strokes, and actuating means for said elements, including roll-curve gears for imparting to said bed during one stroke thereof constant acceleration motion, variable acceleration motion and uniform motion in succession, whereby the variable acceleration motion joins the constant acceleration motion with the uniform motion.

18. The combination with a reciprocating bed of a printing press, of mechanism for driving said bed during its complete reciprocatory cycle, said mechanism including means for imparting to said bed parabolic motion, harmonic motion and uniform motion in succession during one stroke, and other means for imparting to said bed parabolic motion and harmonic motion in succession during the other stroke of its reciprocatory cycle.

19. The combination with a reciprocating machine element of mechanism for driving it during its reciprocatory cycle, members included in said mechanism which constitute the driving means applied to said element during its complete sequence of strokes, actuating means for said members including means for imparting to said machine element parabolic motion, harmonic motion and uniform motion in succession during one stroke, and other means for imparting to said machine element parabolic motion and harmonic motion in succession during the other stroke, the maximum speed during the said other stroke being greater than the maximum speed during the stroke including the uniform motion.

20. The combination with a reciprocating type bed of a printing press, of means for driving said bed during its complete sequence of strokes, said means comprising mechanism which includes a train of gears and associated members arranged and operating to impart to said type bed parabolic motion and harmonic motion during portions of the respective strokes of the bed.

21. The combination with a reciprocating type bed of a printing press, of means for driving said bed during its complete sequence of strokes, said means comprising mechanism which includes a train of roll-curve gears and associated cam members arranged and operating to impart to said type bed parabolic motion and harmonic motion during portions of the respective strokes of the bed.

22. The combination with a reciprocating type bed of a printing press, of mechanism for driving the bed, said mechanism imparting to the bed its complete cycle of movement and including two sets of roll-curve gears acting alternately, said sets of roll-curve gears each imparting to the bed parabolic motion and harmonic motion during portions of the respective strokes of the bed.

23. In a bed motion mechanism, the combination with a reciprocating type bed, of mechanism for driving the bed to produce a working stroke in one direction and an idle stroke in a reverse direction, elements included in said mechanism which constitute the driving means applied to the type bed during its complete sequence of strokes, and means for imparting to said bed through the intermediary of said elements parabolic motion during the initial portion of each stroke, followed by harmonic motion, and parabolic motion during the terminal portion of each stroke, preceded by harmonic motion.

24. In combination with the reciprocating type bed of a printing press, mechanism for driving the bed, elements included in said mechanism which are in constant driving association with said bed and arranged to transmit to the bed its sequence of strokes, two alternately acting sets of roll-curve gears and coacting reversing members for imparting to the type bed, through the intermediary of said elements, its complete cycle of movement, each one of said sets of roll-curve gears imparting to the bed during its reciprocatory strokes constant acceleration motion for the initial portion of a stroke followed by variable acceleration motion, and constant deceleration motion for the terminal portion of a stroke preceded by variable deceleration motion.

25. In combination with the reciprocating type bed of a printing press having a working stroke in one direction and a reverse stroke in the opposite direction, mechanism for driving the bed, elements included in said mechanism which are in constant driving association with said bed and arranged to transmit to the bed its sequence of strokes, two alternately acting sets of roll-curve gears and coacting reversing members for imparting to the type bed, through the intermediary of said elements, its complete cycle of movement, one of said sets of gears driving the bed during the working stroke and the other set driving it during the reverse stroke, each set of roll-curve gears imparting to the bed during the initial portion of a stroke constant acceleration motion followed by variable acceleration motion, and each set imparting to the bed during the terminal portion of a stroke constant deceleration motion preceded by variable deceleration motion, the set of roll-curve gears which drives the bed during the working stroke, additionally imparting to the bed uniform motion for the median portion of the stroke.

26. In combination with the reciprocating type bed of a printing press having a working stroke in one direction and an idle stroke in the opposite direction, mechanism for driving the bed, elements included in said mechanism which are in constant driving association with said bed and arranged to transmit to the bed its sequence of strokes, two alternately acting sets of roll-curve gears and coacting reversing members for imparting to the type bed, through the intermediary of said elements, its complete cycle of movement, one of said sets imparting to the type bed for each working stroke initial, constant acceleration motion followed by variable acceleration motion and then uniform motion, and the other set of roll-curve gears imparting to the type bed for each idle stroke initial, constant acceleration motion followed by variable acceleration motion.

27. In combination with the reciprocating type bed of a printing press having a working stroke in one direction and an idle stroke in the opposite direction, mechanism for driving the bed, elements included in said mechanism which are in constant driving association with said bed and arranged to transmit to the bed its sequence of strokes, two alternately acting sets of roll-curve gears and coacting reversing members for imparting to the type bed, through the intermediary of said elements, its complete cycle of movement, one of said sets imparting to the type bed for each working stroke initial, constant acceleration motion followed by variable acceleration motion and then uniform motion, and the other set of roll-curve gears imparting to the type bed for each idle stroke initial, constant acceleration motion followed by variable acceleration motion, the maximum speed of the bed during each idle stroke being greater than the maximum speed of the bed during each working stroke.

28. The combination with a reciprocating machine element, of mechanism for driving it, including a bed motion shaft constituting the only driving means applied to said element during its complete reciprocatory cycle, at least one driving shaft for imparting movement to said bed motion shaft, and means provided on each of said shafts and operating to impart to said element during one stroke thereof constant acceleration motion, variable acceleration motion and uniform motion in succession, whereby the variable acceleration motion joins the constant acceleration motion with the uniform motion.

29. In combination with the reciprocating type bed of a printing press, of mechanism for driving the bed including elements in constant driving association with said bed and arranged to transmit to the bed its sequence of strokes, and alternately acting driving and reversing means for imparting to the type bed, through the intermediary of said elements, its complete cycle of movement, said means being organized and operating to produce alternately, in one plane of action, variable acceleration, uniform motion and variable deceleration.

HYMAN E. GOLBER.